April 6, 1965     R. C. KIRK ETAL     3,177,099
HIGH POWER OUTPUT MAGNESIUM PRIMARY BATTERY
Filed Aug. 18, 1961

INVENTORS.
Roy C. Kirk
Richard E. Carr
BY C. Kenneth Bjork
AGENT

United States Patent Office 3,177,099
Patented Apr. 6, 1965

3,177,099
HIGH POWER OUTPUT MAGNESIUM PRIMARY BATTERY
Roy C. Kirk and Richard E. Carr, Midland, Mich., assignors to The Dow Chemical Company, Midland, Mich., a corporation of Delaware
Filed Aug. 18, 1961, Ser. No. 132,506
2 Claims. (Cl. 136—100)

This invention relates to a high drain primary cell system and more particularly is concerned with a multi-cell, short-life, high drain primary battery utilizing magnesium or magnesium-base alloy anodes.

It is a principal object of the present invention to provide a multi-cell, primary battery capable of operating at high power outputs for as long as 12 hours or more.

It is an additional object of the present invention to provide a primary battery composed of a multiplicity of cells utilizing a common electrolyte wherein inter-cell shorting through the electrolyte is held to an acceptable low level during operation.

It is a further object of the present invention to provide a multi-cell, high power output, primary battery activated by immersion in sea water which battery can be used to power torpedoes and other underwater driven devices.

It is another object of the present invention to provide a primary battery that is relatively inexpensive to fabricate and has a high energy output per unit of weight.

These and other objects and advantages will become apparent from the detailed description presented hereinafter when read in conjunction with the accompanying drawings.

In general, the battery comprises a plurality of individual cells or modules joined together in an electrical series arrangement. Each of the modules consists of a plurality of magnesium based metal anodes connected in parallel electrical arrangement to a common electron conducting connector and a like number of electron conducting cathodes of a material having a low hydrogen overvoltage connected electrically in parallel to a second common electron conducting connector. End plates separate one module from another. The anodes and cathodes are alternately spaced within a given module, the spaces between the electrodes providing a passage for electrolyte. The entire assembly of series connected modules is encased in an electrically insulating jacket or cover having an entry port and exit outlet which during operation of the battery provides for a continuous flow of electrolyte through the battery.

Figure 1:
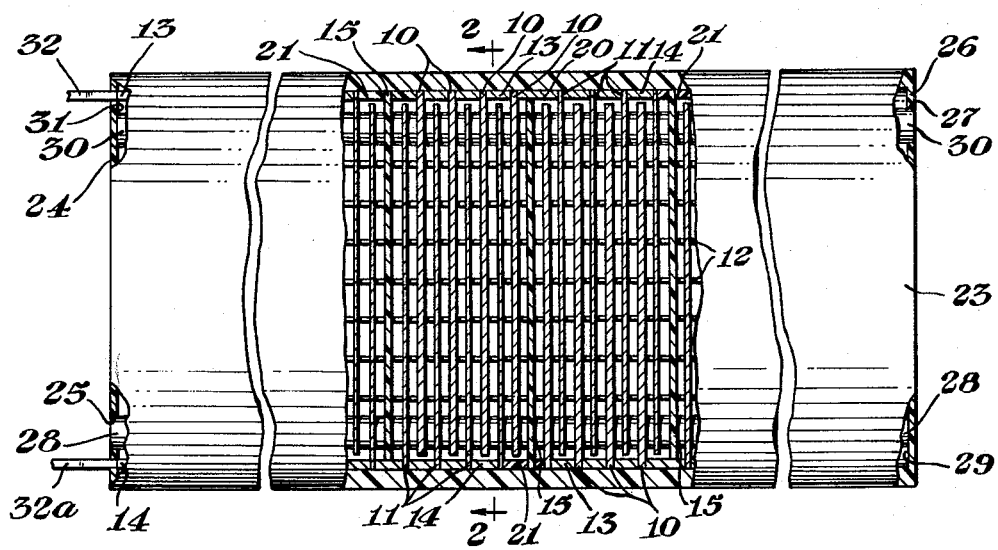
FIGURE 1 is a side view, partly in section, of one embodiment of a battery of the present invention.
Figure 2:
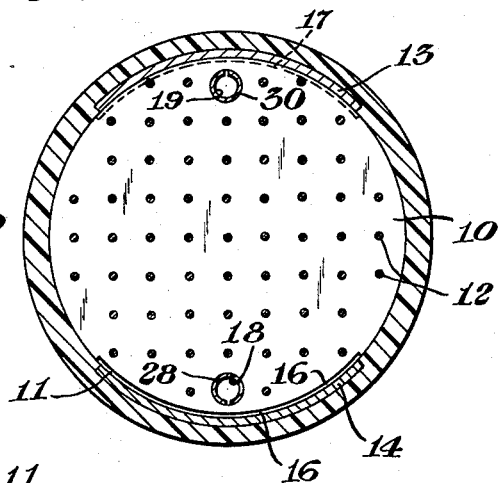
FIGURE 2 is a cross-sectional view of this embodiment of the battery taken along line 2—2 of FIGURE 1.

One embodiment of the new and novel battery shown in FIGURES 1 and 2 consists of a plurality of modules each made up of an equal number of alternating circular, flat, magnesium or magnesium based alloy anodes 10 and plantinized electron conducting cathodes 11. The alternately positioned anode and cathode electrodes are positioned in the module so that their flat faces are parallel and are held spaced apart by small, cylindrical shaped insulting spacers 12. For ease in preparing the modules the spacers 12 can be fastened to facing sides of adjacent plates by an adhesive. Within each module, all of the anodes 10 are connected to a common curved conductive slotted metal contact shim or connector 13, e.g. of copper, which extends for a short distance around the periphery of the anodes and runs the length of the individual module. The cathodes 11 are connected to a second similar metal contact shim 14 thereby providing a parallel arrangement of the electrodes within the module. The alternating anodes and cathodes 11 are so positioned in the module that the curved contact shims 13 and 14 are diametrically opposed. (Conveniently, the substantially circular electrodes can be fitted snugly into slots in the shims by means of a mating extension on their periphery.) Similarly shaped circular plates 15 usually of an electrically insulating material are used as common end plates separating one module from another. The anodes 10 all have an indented portion 16 in the edge opposite that connected to the copper shim 13. This indentation 16 extends a short distance beyond the ends of the shim 14 thereby preventing the anodes from contacting the shim 14 to which the cathodes 11 are connected when these are assembled into a battery. Likewise each of the cathodes 11 have a similarly shaped and positioned indentation 17 on their periphery for the same purpose.

Each of the anodes 10, cathodes 11 and end plates 15 defines an opening 18 near the edge attached to the connector shim and a second opening 19 diametrically opposite the first opening 18. In the modules, the plates are positioned so that these openings are in alignment.

The modules are connected electrically to each other in a series arrangement by joining the end anode 10 of a given module with the end cathode 11 of an adjacent module by means of an electron conducting connector 20.

Figure 3:
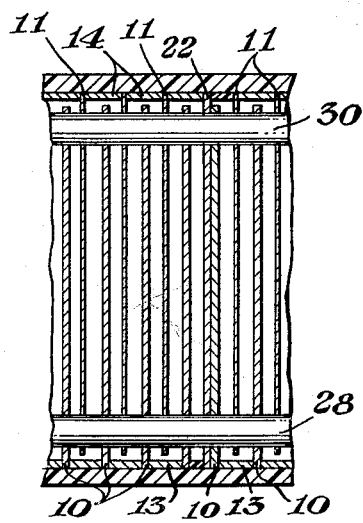
FIGURE 3 illustrates one means of connecting electrodes from adjacent cells of the instant battery in series arrangement.

The end plates 15 of each module are held in position by a a shim 21 of an electrically insulating material positioned at 180° from the connector 20. In the instant embodiment, these end plates are fabricated from a non-electrically conducting material. Alternatively these end members can be of a metallic conductor e.g. a copper disc. With such conducting end plates, or discs 22, the disc 22 can be attached to the common connector 14 for the cathodes 11 in a given cell and also be fastened directly to the end anode plate 10 of an adjacent module thereby providing the series connection between cells as shown in FIGURE 3. Correspondingly, the disc 22 can be connected to the anode connector 13 of a module and fastened to the end cathode member 11 of an adjacent module to achieve continued series connection throughout the battery.

The modules are encased in an electrically insulating liquid impervious protective coating or jacket 23. One end wall 24 of the jacket 23 is fitted with an inlet port 25 positioned so as to mate with the aligned openings 18 of the modules. The other end wall 26 of the jacket 23 is fitted with an exit port 27, this port being positioned to mate with the aligned openings 19 in the modules.

A manifold tube 28, having a narrow slot extending over its entire length, is passed through inlet port 25 and through opening 18 of the plates in the modules until one end abuts, and is fastened as by adhesive bonding, with the inside face 29 of end wall 26, its other end being rigidly fixed, as by adhesive bonding, to the inlet port 25. A second similar manifold 30 is passed through exit port 27 and through openings 19 in the plates of the modules until it abouts with the inside face 31 of the end wall 24, the other end of this manifold 30 being rigidly fixed to the exit port 27.

The so-assembled battery can be fitted with conventional leads or contacts 32–32a which contact the connectors of the modules and extend outward from the case for attachment to the device to be operated or driven.

The anode material used in the cells can be magnesium or a magnesium based alloy having a magnesium content of at least 80 weight percent which can be fabricated into the desired shape. Desirably the selection of the anode material will be made from those alloys wherein optimum cell voltages and high anode efficiencies can be realized. Especially useful anode materials are those alloys which contain from about 1 to about 6 weight percent or more of aluminum. Preferably alloys containing the higher amounts of aluminum will be employed as these, during battery operation, yield a flocculent, loosely held corrosion product that is readily washed away from the anode.

Examples of a number of alloys suitable for use as anode materials are the AZ31, AZ10, AZ63, AZ61A, A3A, AZ21 and the like magnesium based alloys as designated by ASTM nomenclature.

The size of the anode is dictated by the size limitations of the cell. The thickness of the anode will be determined by the length of operating life desired in the cell. Normally, for most operations the anode thickness will range from about 0.010 up to about 0.50 inch or more.

The material used for the cathode is a thin sheet-like electron-conductive member the surface of which has a low hydrogen overvoltage. Materials which are suitable for use as cathodes in the present invention are those exhibiting a maximum hydrogen overvoltage of about 0.50 volt as measured in a 0.1 molar aqueous sulfuric acid solution at a current density of about 0.01 ampere per square inch; including for example platinum, gold, iridium, nickel, osmium, platinized conductive metals, platinum plated carbon and the like.

Particularly suitable cathodes can be fabricated by platinizing a thin sheet of an electron conductive material, for example, a metal such as mild steel, nickel, copper, brass, etc. or other conductors, such as carbon, which exhibit good electrical conductivity in thin sections and which provide a good base for platinizing.

The connectors for joining the anodes and cathodes within a given module in parallel arrangement and those used for connecting adjacent modules in electrical series arrangement can be of any electron conductive material used for electrical leads, junctions and the like connections. Ordinarily, copper, aluminum, silver or other metals will be used.

The connectors for the anodes or cathodes as well as for joining modules together can be in the shape of a rod, bar, plate or conveniently, as described for the embodiment shown in the drawings, in the form of slotted shims which not only serve to connect the electrodes electrically one to another but also act to hold these in alignment and in a given position within the enveloping jacket. The electrodes can be fastened to the connections by any means known to one skilled in the art. One preferred means is to fit the electrodes into a slot in the connector whereby they will be held snugly in position.

The outer case or jacket, module end plates, manifold tubes and spacers used in the battery can be prepared from any of a wide variety of insulating, non-electron conducting materials possessing the requisite properties and characteristics to meet environmental and structural conditions and limitations to which the battery may be subjected. Natural and synthetic rubbers, silica glasses, ceramics, phenolformaldehyde resins, polystyrene resins, polyethylene, polypropylene, asphalt based materials, hydrophobic waxes, arcylic resins sold under the trademark Lucite, Saran and the like are illustrative of the insulators useful for this application.

These non-conductive elements can be fabricated by conventional forming techniques such as molding, extruding, drawing and the like.

The outer case can be prepared independently as a tubular member, for example, of such a size to snugly accommodate the electrically connected electrodes and end plates and the so-called modules then be inserted therein so that the plate-like members are perpendicular to the axis of the cylinder, the end walls of the jacket then can be attached by conventional means such as adhesive bonding, screw fasteners, clamps, etc. to give a liquid impervious seal. Alternatively the entire case can be molded or formed directly around the assembled modules and manifold tubes.

The spacers should be of such size that they cover a minimum amount of the anode surface. Preferably, these will be in the shape of rods, wires, spherical beads, small right cylinders, regular prisms, strips, and the like.

The tubular dual manifold system is a preferred means for introducing electrolyte into the battery and for removing anode corrosion product electrolyte which has passed through the cells, and product gases from the battery. With this manifold system which utilizes continuous narrow slots running the length of the tube for passage of water, intercell shorting is minimized since there is produced in the battery a resulting ion path of very high resistivity from cell to cell.

Preferably the electrolyte inlet port will be at the bottom of one end of the battery and the exit port at the top of the opposite end. Also, for those devices which are propelled and move through the electrolyte, e.g. torpedoes, it is desirable that the inlet port be at the front of the battery, i.e. facing the direction of movement of the device. However, these are not limiting factors as the low molecular weight gases, primarily hydrogen, liberated by cell reaction will rise up through the cells, thereby establishing a natural flow pattern of electrolyte from bottom to top.

If desired, an impressed flow of electrolyte, e.g. pumped from an external reservoir, can be used to introduce electrolyte into the battery.

Alternatively, if desired, the inlet and outlet ports for electrolyte can be holes of controlled size and spacing extending through the outer casing. With this arrangement intercell shorting can be minimized by placing the holes at 90° angles in adjacent modules and by varying the angle at which these penetrate the casing.

Although any of a wide variety of aqueous electrolyte solutions are useful to activate the present cell, preferably the electrolyte for the cell will be selected from the group consisting of sea water, the aqueous alkali metal chlorides and bromides, aqueous ammonium chloride, aqueous ammonium bromide and aqueous alkaline earth metal chlorides and bromides including magnesium chloride and magnesium bromide. These electrolytes can be used alone or as mixtures.

The concentration of the electrolyte to be used is not critical as satisfactory performance is obtained using sea water which contains as the prime solute about 3 percent by weight sodium chloride as well as even more dilute solutions, i.e. those containing about 1 percent or less by weight solute. Also, more concentrated electrolytes including even those which are saturated with the solute member can be employed.

In any event, it is essential that the electrolyte move through the modules. This movement is needed in order to remove corrosion product from the close-spaced electrodes and to dissipate heat generated in the battery because of the relatively high rate of power output. Therefore, this battery finds particular effective utility in sea water operations where the entire unit is immersed in the electrolyte and is used to propel an underwater vehicle.

In fabricating the battery, it is desired that the distance between alternating plates of opposite polarity, i.e. the anodes and cathodes, within a given module be kept as small as possible in order to minimize internal cell resistance, which shows up as lost battery energy, since the ion path resistivity of the electrolyte increases markedly with increase in length of this path between electrodes.

The minimum distance between electrodes is that distance which still permits electrolyte flow through the battery and gives room for the anode corrosion product to slough off and be washed away. Ordinarily the spacing between electrodes will be from about 0.010 to about 0.20 inch.

To further illustrate the present invention, a battery was prepared according to the embodiment shown in FIGURES 1–2. This battery was designed to specifications requiring that it be capable of delivering a power output of about 106 kilowatt hours at 28 volts over a 12 hour period in sea water and was to have a weight limitation of 1500 pounds (less electrolyte) and a volume limitation of 16 cubic feet.

Cell modules were prepared having 14 circular AZ61A plate-like anodes (each anode being 20 inches in diameter by 0.036 inch thick) and 14 platinum coated copper cathodes (each being 20 inches in diameter and about 0.004 inch thick). The electrodes were separated by cylindrically-shaped polystyrene resin spacers of length to give a distance of about 0.016 inch between electrodes. The anodes were connected in parallel to a common curved copper bus bar shim and the cathodes connected in a similar fashion to a second similar copper connector. Each module had a common circular end plate prepared from a polystyrene resin held in a polystyrene shim fastened to one of its sides.

Seventy-six modules were connected in series using copper connectors as shown in the figures, in such a manner that two openings in all of the plates were in direct alignment. The so-assembled modules then were covered with a tubular polystyrene jacket.

Separate polystyrene resin conduits, i.e. manifolds, having a small slot extending along their entire length were inserted through the two series of openings defined by the plates. These conduits were of approximately the same length as the resulting cylindrically shaped battery assembly.

Polystyrene resin plates having a port therein to accommodate one manifold were fastened to the ends of enveloping jacket, and the manifolds attached thereto to give a liquid impervious case through which liquid could pass only at the desired inlet and outlet ports.

The resulting battery weighed about 1310 pounds (less electrolyte) and had a volume of about 14 cubic feet. With a sea water electrolyte, the battery voltage at a maximum current density of about 9.6 amperes per square foot was about 28 volts and the cell had a maximum current output of about 536 amperes, which for a 12 hour operating period is equivalent to a power output of about 120 kilowatt hours.

A second battery of this same design was prepared utilizing AZ61A anodes having a thickness of about 0.072 inch and a spacing of about 0.03 inch between electrodes in a module. Seven anodes were connected in parallel to a common connector and a like number of cathodes similarly connected to a second connector in each module. Eighty-nine modules were connected in series to give the core of the battery.

The final battery had a total weight of about 1265 pounds and a volume of about 15.3 cubic feet and gave a power output approximately the same as for the battery described hereinbefore.

The illustrative batteries described herein represent only one embodiment of the present invention as will be recognized by one skilled in the art and are not meant to be limiting.

In a manner similar to that shown hereinbefore a battery can be fabricated having a multiplicity of cells using rectangular AZ21 magnesium alloy anodes, platinized nickel cathodes and a natural rubber outer case, spacers, manifold tube and module end plates.

Additionally, a battery can be made containing AZ10 elliptically shaped anodes, similarly shaped rhodium coated carbon cathodes and having its non-electrically conductive parts fabricated from silica glass.

Modules containing square AZ63 alloy anodes, gold plated mild steel cathodes, ceramic end plates and polyethylene spacers and manifold tube, can be joined in series and placed in a Lucite case.

Likewise a battery can be constructed using cell magnesium anodes, platinum coated brass cathodes and synthetic rubber insulating members.

Any of the construction materials listed herein for fabricating a given member can be utilized in a battery with any of the other suggested construction materials. Likewise the batteries can be activated using any of the electrolytes presented hereinbefore.

Other modifications can be made in the present invention without departing from the spirit or scope thereof for it is understood that we limit ourselves only as defined in the appended claims.

We claim:
1. A high-drain magnesium primary battery which comprises; a plurality of individual modules, each of said modules containing a plurality of an equal number of alternately spaced circular, flat magnesium based alloy anodes and thin platinized electron conductive cathodes and non-electron conducting flat, circular end members, said alternately spaced anodes and cathodes positioned so that their flat faces are parallel, electrically insulating spacers placed between said anodes and said cathodes, all of the anodes in each of said modules connected to a common metal contact and all of said cathodes in each of said modules connected to a second similar common metal contact, said anodes and cathodes being positioned in the module so that the metal contacts holding the electrodes are diametrically opposed, each of said anodes having an indentation in the edge opposite that connected to the metal contact, said indentation extending a short distance beyond the ends of the contact holding said cathodes, and each of said cathodes having a similarly shaped and positioned indentation at its periphery, each of said anodes, cathodes and module end plates defining an opening near one edge and defining a second opening diametrically opposite said first opening, the plates being positioned so that the openings are in axial alignment, said end members being fastened at one edge to an electrically insulating shim, said modules connected electrically to each other in a series arrangement having the end anode of a given module joined to the end cathode of an adjacent module by a conductive metal connector positioned diametrically opposite to said insulating shim holding said end plate, said connected modules encased in an electrically insulating, liquid impervious, cylindrically shaped protective coating, said coating having one end wall fitted with an inlet port aligned to mate with one series of openings in the connected module, the other end wall of said protective coating having an exit port positioned to mate with the second series of openings in the connected modules, a manifold tube, said tube being electrically insulating and having a narrow slot along its entire length, said tube having one end attached to the inlet port in the end wall of said protective coating and passing through all the openings in the plates of the modules aligned with said inlet port, a second similar manifold tube having one end attached to the exit port in the other end wall of said protective coating and passing through all the openings in the plates of the modules aligned with said exit port, and an aqueous electrolyte, said electrolyte continuously flowing into said inlet port during battery operation, between the plates of said modules and exiting from the battery at said exit port.

2. A high-drain magesium primary battery which comprises; a plurality of individual modules, each of said modules containing a plurality of an equal number of alternately spaced magnesium based alloy anodes and thin electron conductive cathodes and non-electron conducting end members, said cathodes being a material exhibiting a maximum hydrogen overvoltage of about 0.50 volt as measured in a 0.1 molar aqueous sulfuric acid solution at a current density of about 0.01 ampere per square inch, said alternately spaced anodes and cathodes positioned so that their faces are parallel, electrically insulating spacers placed between said anodes and said cathodes, all of the anodes in each of said modules connected to a common metal contact and all of said cathodes in each of said modules connected to a second common metal contact, said anodes and cathodes being positioned in the module so that the metal contacts holding the electrodes are diametrically opposed, each of said anodes being electrically insulated on the edge opposite that connected to the metal contact, the insulation on said edge extending a short distance beyond the ends of the contact holding said cathodes, and each of said cathodes being similarly insulated at its periphery, each of said anodes, cathodes and module end members defining an opening near one edge and defining a second opening diametrically opposite said first opening, the anodes, cathodes and end members being positioned so that the openings are in axial alignment, said module end members being fastened at one edge to an electrically insulating shim, said modules connected electrically to each other in a series arrangement having the end anode of a given module joined to the end cathode of an adjacent module by a conductive metal connector positioned diametrically opposite to said insulating shim holding said end plate, said connected modules encased in an electrically insulating, liquid impervious, protective coating, said coating being shaped to conform with the shape of said anodes, cathodes and module end plates, said coating having one end wall fitted with an inlet port aligned to mate with one series of openings in the connected module, the other end wall of said protective coating having an exit port positioned to mate with the second series of openings in the connected modules, a manifold tube, said tube being electrically insulating and having a narrow slot along its entire length, said tube having one end attached to the inlet port in the end wall of said protective coating and passing through all the openings in the plates of the modules aligned with said inlet port, a second similar manifold tube having one end attached to the exit port in the other end wall of said protective coating and passing through all the openings in the plates of the modules aligned with said exit port, and an aqueous electrolyte, said electrolyte continuously flowing into said inlet port during battery operation between the anodes and cathodes of said modules and exiting from the battery at said exit port.

References Cited by the Examiner
UNITED STATES PATENTS

| | | | |
|---|---|---|---|
| 2,639,306 | 5/53 | Fischbach | 136—100 |
| 2,661,388 | 12/53 | Warner et al. | 136—100 |
| 2,745,893 | 5/56 | Chubb et al. | 136—100 |
| 2,921,111 | 1/60 | Crowley et al. | 136—100 |
| 2,934,583 | 4/60 | Stevens | 136—100 |
| 2,996,564 | 8/61 | Morton | 136—90 |
| 3,036,142 | 5/62 | Goldenberg et al. | 136—100 |
| 3,100,164 | 8/63 | Solomon et al. | 136—90 |
| 3,102,058 | 8/63 | Jones | 136—90 |

JOHN H. MACK, *Primary Examiner.*

JOHN R. SPECK, MURRAY TILLMAN,
*Examiners.*